United States Patent [19]

Panjuchin

[11] Patent Number: 5,522,278
[45] Date of Patent: Jun. 4, 1996

[54] SELF-LOCKING DUAL WORM GEAR AND THE TOOLS NEEDED TO PRODUCE IT

[75] Inventor: Wiktor W. Panjuchin, Wladimir, Russian Federation

[73] Assignee: Varioline Handelsgesellschaft mbH, Sehnde, Germany

[21] Appl. No.: 292,190

[22] Filed: Aug. 19, 1994

[30] Foreign Application Priority Data

Aug. 21, 1993 [DE] Germany .......................... 43 28 221.0

[51] Int. Cl.$^6$ .............................. F16H 55/08; B23F 13/00
[52] U.S. Cl. ..................... 74/424.7; 29/893.31; 74/458; 209/48
[58] Field of Search ............................. 74/424.5, 424.7, 74/458; 29/893.31; 409/48

[56] References Cited

U.S. PATENT DOCUMENTS

| | | | |
|---|---|---|---|
| 2,553,383 | 5/1951 | Roano | 74/466 |
| 2,553,384 | 5/1951 | Roano | 74/466 |
| 2,973,660 | 3/1961 | Popper | 74/458 X |
| 3,216,273 | 11/1965 | Colmer, Jr. | 74/457 |
| 3,247,736 | 4/1966 | Roth | 74/462 |
| 3,481,215 | 12/1969 | Howell | 74/424.5 |
| 3,776,060 | 12/1973 | Pessen | 74/424.7 |
| 4,858,487 | 8/1989 | Mercier | 74/424.7 |

FOREIGN PATENT DOCUMENTS 939240 2/1956 Germany .

OTHER PUBLICATIONS

Product Engineering; Article titled Twinworm Gear; Jan. 18, 1960; pp. 39–43.

"Selbsthemmendes Doppelschraubgetriebe" Konstruktion Bd. 44 (1992) No. 10, p. A28.

Opitz, Handbuch, Verzahntechnik, VEB Verlag Technik, Berlin, Jg. 1973, pp. 206–207.

*Primary Examiner*—Allan D. Herrmann
*Attorney, Agent, or Firm*—Shlesinger, Arkwright & Garvey

[57] ABSTRACT

A self-locking dual worm gear with parallel axes and linear contact for the worms with involute herringbone gears is characterized by the fact that the cross sections for curvature radii $p_{nm1}$ and $p_{nm2}$ and the longitudinal sections for curvature radii $p_{xm1}$ and $p_{xm2}$ of the worm profile are always determined at the point of contact M for the teeth and with the following equations:

$p_{nm1} = p_{tm1}/\cos \beta_{B1}$; $p_{nm2} = p_{tm2}/\cos \beta_{B2}$ $p_{xm1} = p_{nm1} \cdot \sin \beta_{B1} = p_{tm1} \cdot g\beta_{B1}$; $p_{xm2} = p_{nm2} \cdot \sin \beta_{B2} = p_{tm2} \cdot tg\beta_{B2}$ wherein $p_{tm1}$ and $p_{tm2}$ represent the curvature radii of an involute profile in the cross section at contact point M and $\beta_{B1}$ and $\beta_{B2}$ are the tooth edge inclinations for the worms with $$p_{tm1} = \sqrt{r_{m1}^2 - r_{B1}^2} \quad \text{and} \quad p_{tm2} = \sqrt{r_{m2}^2 - r_{B2}^2}$$

wherein $r_{m1}$ and $r_{m2}$ represent the operational radii for the circles, which run through contact point M and $r_{B1}$ and $r_{B2}$ are the basic circle radii for the worms. One tool for manufacturing the worm profiles for the self-locking dual worm gear has turning tools with rounded cutting edges and curvature radii $R_1$ and $R_2$ which are determined with the following formulas:

$$R_1 = 0.95 \cdot r_{B1} \cdot tg\beta_{m1} \cdot \sqrt{1 - (r_{B1}/r_{m1})^2} \quad ;$$

$$R_2 = 0.95 \cdot r_{B2} \cdot tg\beta_{m2} \cdot \sqrt{1 - (r_{B2}/r_{m2})^2}$$

3 Claims, 4 Drawing Sheets

SELF-LOCKING DUAL WORM GEAR AND THE TOOLS NEEDED TO PRODUCE IT

BACKGROUND AND OBJECTS OF THE INVENTION

The invention concerns a self-locking dual worm gear with parallel axes with two worms having involute herringbone teeth and linear contact of both worms as well as the tools to produce this gear.

One special feature of such gears is the very large tooth inclination angle which makes it possible to use the production method used for helical toothed gears, spinning machines or worms to cut these particular gears.

The invention at hand is designed to provide a self-locking dual worm gear that is simple to produce and, furthermore, to provide a simple tool, designed to produce in a simple and reproducible method a dual worm gear with quasi involute profile for its teeth.

This problem is solved by the design with the characteristics set forth below including a tool for producing the dual worm gear.

Advantageous and practical improvements to the design solutions described in this invention will be apparent from the following detailed description. This invention is to be explained in more detail in the following with the aid of the attached drawing, which shows a design version.

DESCRIPTION OF THE PREFERRED EMBODIMENTS

Figure 1:
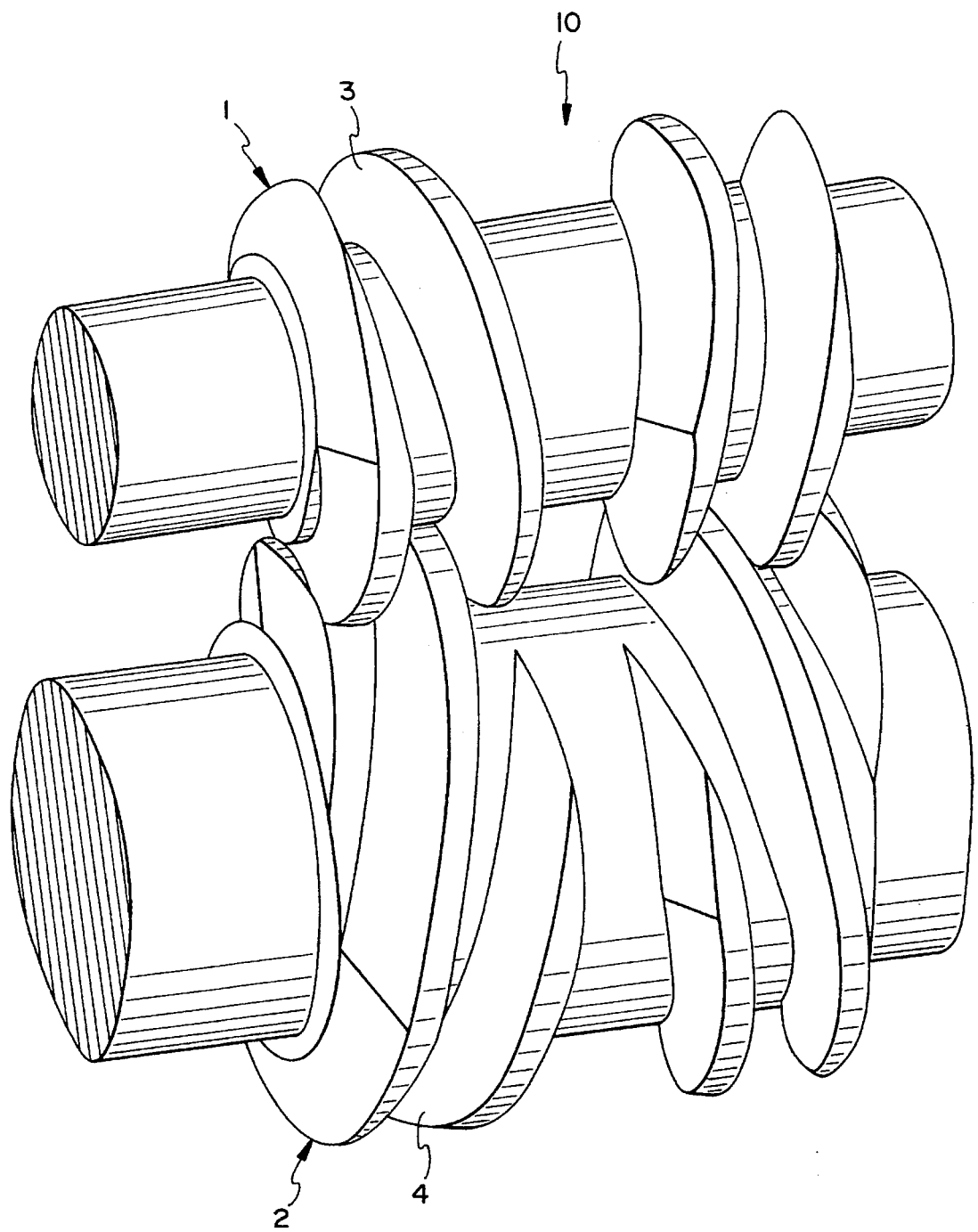
FIG. 1 is an exploded view of a dual worm gear with outside tooth system.

A dual worm gear 10 is shown in the drawing (FIG. 1), which is designed for a reduction of the rotational movement and conversion to forward movement during the forward run and for self-locking during the reverse run.

The dual worm gear consists of a first worm 1 and a second worm 2, each with helical or herringbone teeth 3 and 4, in the shape of several coils.

Worms 1 and 2 have involuted profiles which can be manufactured, at least closely enough, with the aid of a turning tool (not shown) with rounded cutting edge, which is inserted into a taper and feed rod lathe.

Figure 2:
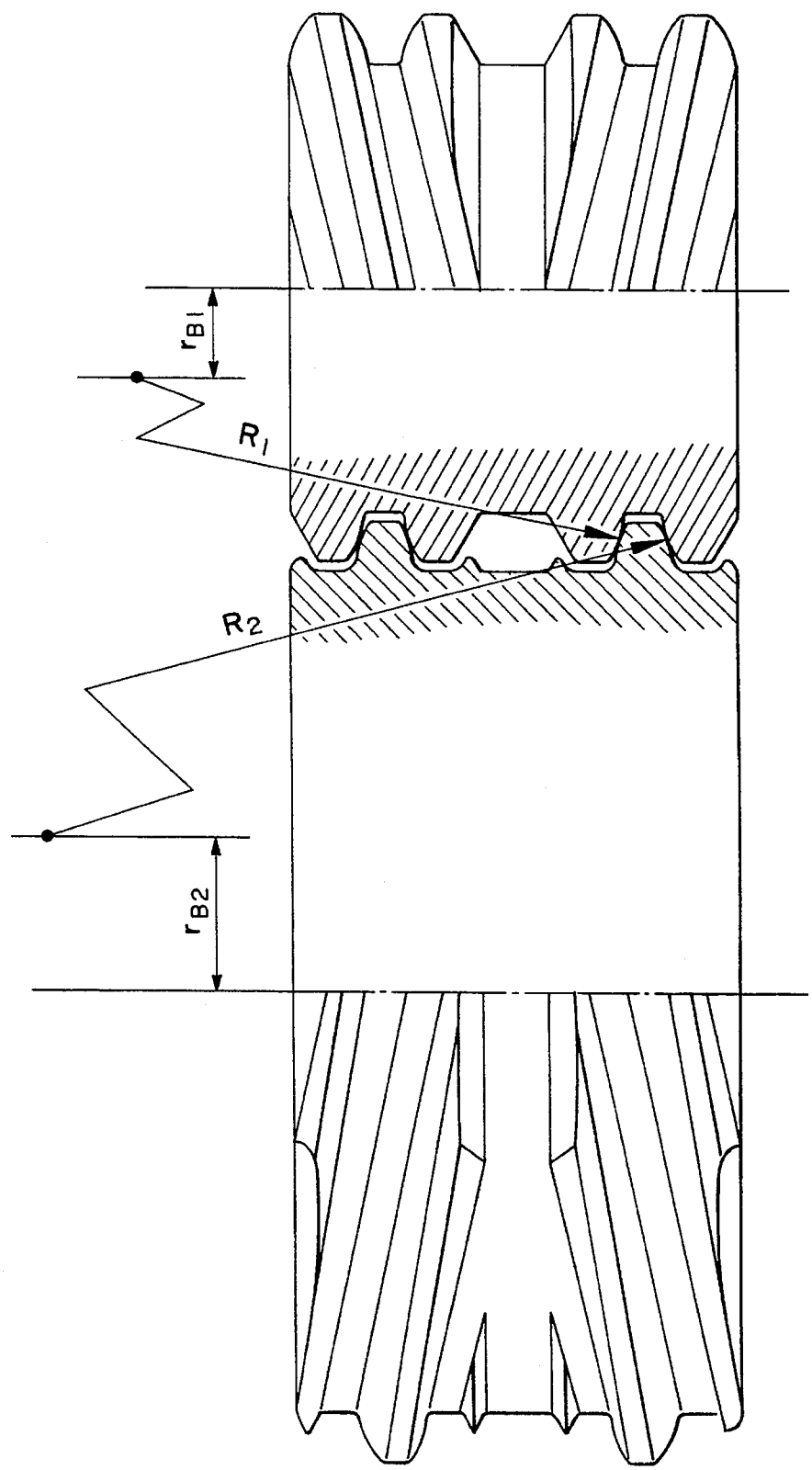
FIGS. 2 through 4 detail the geometric dimensions and proportions of the dual worm gear as shown in FIG. 1.

The curving radii R1 and R2 of the turning tool, which are shown in FIG. 2, and are suitable for producing the involuted profiles, are calculated as follows:

Radii $r_1$ and $r_{m2}$ for the circles that run through contact point M1 for the teeth of worms 1 and 2, are called operating radii.

The curvature radii $p_{tm1}$ and $p_{tm2}$ for the involuted profiles of the cross sections for worms 1 and 2 at contact point M, around centers O1 and O2 of base circles 12 and 14 for worms 1 and 2, with base circle radii $r_{B1}$ and $r_{B2}$ are determined from triangles $\Delta O_1 N_1 M$ and $\Delta O_2 N_2 M$, which are formed by tangents $MN_1$ and $MN_2$ from contact point M to the base circles 12 and 14, the normals $O_1 N_1$ and $O_2 N_2$ and the radius vectors $O_1 M$ and $O_2 M$ to contact point M (see also FIG. 3) as follows:

$$P_{tm1} = \sqrt{r_{m1}^2 - r_{B1}^2} \quad ; P_{tm2} = \sqrt{r_{m2}^2 - r_{B2}^2} \quad (1)$$

With the aid of the Menjesch Theorem, the curvature radii $p_{nm1}$ and $p_{nm2}$ for the cross section involute are determined to be:

$$P_{nm1} = P_{tm1}/\cos\beta_{B1}; \quad P_{nm2} = P_{tm2}/\cos\beta_{B2} \quad (2)$$

whereby: $\beta_{B1} = \beta_{B2} = \beta$ is the tooth inclination angle at the base circles for worms 1 and 2.

The longitudinal cross sections of curvature radii $p_{xm1}$ and $p_{xm2}$ are obtained with the same theorem and formula (1) and are:

$$p_{xm1} = p_{nm1} \cdot \sin\beta_{B1} = p_{tm1} \cdot tg\beta_{B1}; \quad p_{xm2} = p_{nm2} \cdot \sin\beta_{B2} = p_{tm2} \cdot tg\beta_{B2}. \quad (3)$$

If radii $R_1$ and $R_2$ are set equal to radii $p_{xm1}$ and $p_{xm2}$, we obtain a tooth system that is practically equal to an involute tooth system because the tooth height is very low and the deviation of the circle profile from the involute profile normally does not exceed the machining tolerance.

In order to avoid the possibility of an edge contact (e.g. as the result of imprecise machining), it makes sense to select radii $R_1$ and $R_2$ to be somewhat smaller than $p_{xm1}$ and $p_{xm2}$, as for the Novikov gears with cross section profiles MH 4229-63. Thus, by using turning tools with round cutting edges, worms can be produced which have a tooth system with a point contact that is similar to the point contact in the Novikov gears.

If $tg\beta_B$ is determined with formula (3), we obtain:

$$tg\beta_{B1}/tg\beta_{m1} = r_{B1}/r_{m1}; \quad tg\beta_{B2}/tg\beta_{m2} = r_{B2}/r_{m2} \quad (4)$$

and if we take formulas (1) and (3) also into account, we obtain the following for $R_1$ and $R_2$:

$$R_1 = 0.95 \cdot r_{B1} \cdot tg\beta_{m1} \cdot \sqrt{1 - (r_{B1}/r_{m1})^2} \quad ; \quad (5)$$

$$R_2 = 0.95 \cdot r_{B2} \cdot tg\beta_{m2} \cdot \sqrt{1 - (r_{B2}/r_{m2})}$$

whereby $\beta_{m1}$ and $\beta_{m2}$ represent the tooth inclination angles on the operational radii.

A tooth system which is equivalent to the involute tooth system and a tooth system with the point contact can also be achieved with a circular profile on just one worm while the other one can have an Archimedean profile. The curvature radius for the worm with circular profile here must be 10% smaller than the respective returned curvature radius for the involute profiles.

The tooth system of two Archimedean worms, which are cut by the turning tools with straight cutters has a contact point at the beginning. However, after a short break-in period, the contact spot assumes the same form as that for the involute worms. That is why the use of such worms is possible only with an unconditional introductory lap and low requirements concerning the tooth play.

Figure 3:
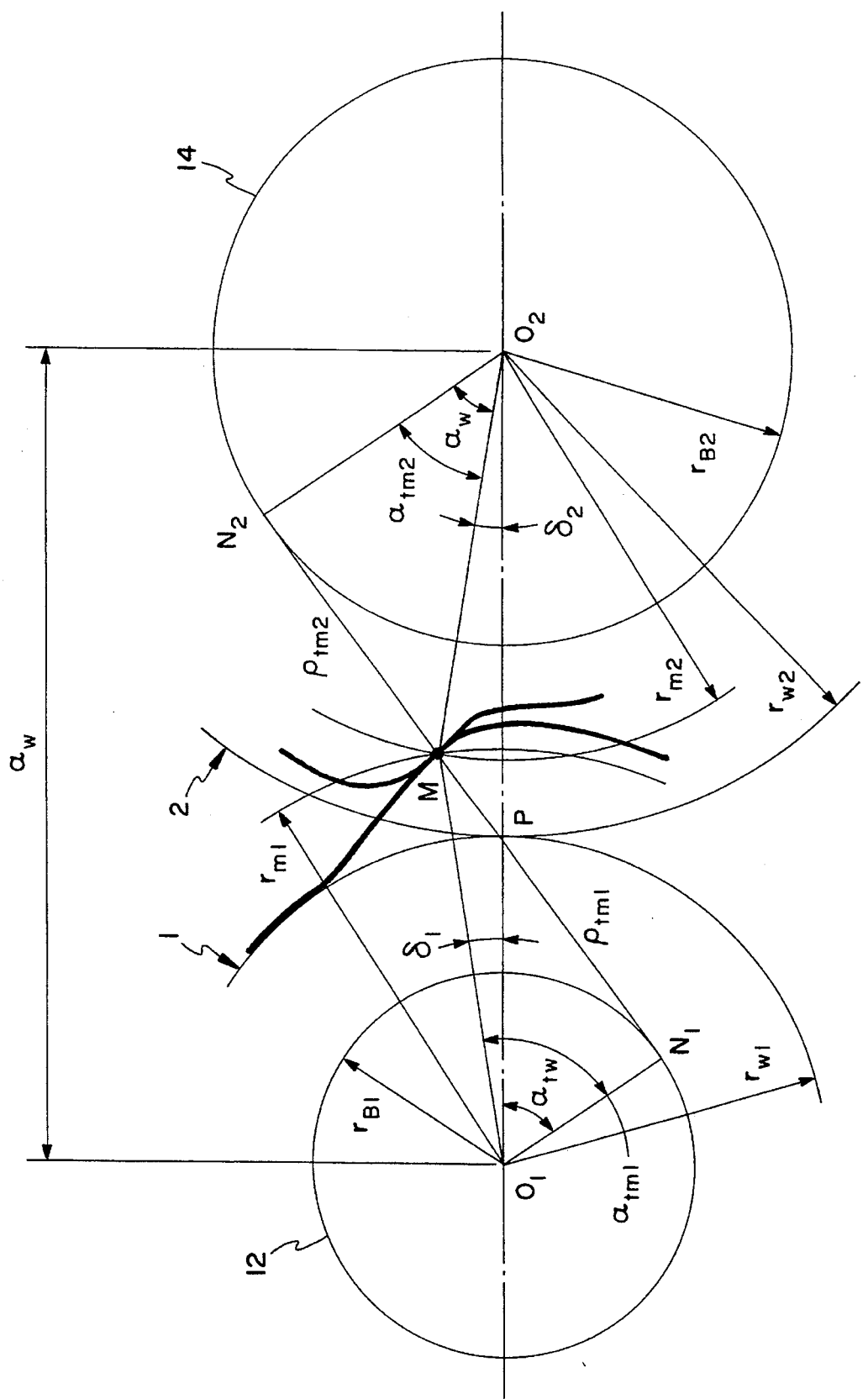

The geometric calculation of self-locking (1) dual worm gears with point contacts of the type taken into consideration here presupposes that the forward movement of the gears is assured in each operational mode: during the driving mode as well as during the braking mode. The tooth system diagram of such a gear with contact in point M is shown in FIG. 3.

When designing a gear with worms, the following starting values are necessary to permit a free selection of the axle distance: number of teeth $Z_1$ and $Z_2$, minimum value $f_{min}$ and maximum value $f_{max}$ of the sliding friction coefficient for the tooth system, a normal cross section of the second wheel $\alpha_{nm2}$ of the profile angle and axle speed $P_x$, which is selected because of the stability calculation.

The inclination angles for the teeth $\beta_{m1}$ and $\beta_2$ on the operational radii are determined under the condition of the self-locking factor for gears (1) and are:

$$\cos\beta_{m1} \leq tg\alpha_{nm1} \sqrt{\sqrt{0.25 + f_{min}^2/\sin^2\alpha_{nm1}} - 0.5} \quad ; \quad (6)$$

$$\cos\beta_{m2} \leq tg\alpha_{nm2} \sqrt{\sqrt{0.25 + f_{max}^2/\sin^2\alpha_{nm2}} - 0.5} \quad ; \quad (7)$$

whereby $\alpha_{nm1}$ is the profile angle for the normal cross section of the first worm.

With the aid of relations:

$$\cos\gamma = \sin\beta_{m1} \cdot \cos\alpha_{nm1}; \quad (8)$$

$$\cos\gamma = \sin\beta_{m2} \cdot \cos\alpha_{nm2} \quad (9)$$

whereby $\gamma$ is the angle between the normal and the worm axle which, together with angle $\beta_B$ forms a 90° angle, equations (6) and (7) can now be written as follows:

$$tg\beta_{m1} \geq \sqrt{\cos^2\gamma/f_{min}^2 + ctg^2\gamma} \quad ; \quad (10)$$

$$tg\beta_{m2} < \sqrt{\cos^2\gamma/f_{max}^2 + ctg^2\gamma} \quad . \quad (11)$$

The side areas of the teeth form worm screw surfaces with the angles of inclination $\lambda_{m1}$ and $\lambda_{m2}$ on the operational radii, which are determined with the following formulas:

$$\lambda_{m1} = 90° - \beta_{m1}; \quad \lambda_{m2} = 90° - \beta_{m2} \quad (12)$$

The operational radii for the worms can be determined with the following formulas (4):

$$r_{m1} = P_x \cdot z_1 \cdot tg\beta_{m1}/2\pi; \quad r_{m2} = P_x \cdot z_2 \cdot tg\beta_{m2}/2\pi \quad (13)$$

By taking into consideration that $tg\beta_B = ctg\gamma$, the radii for the basic worm circles can be determined with the following formulas:

$$r_{B1} = P_x \cdot z_1 \cdot ctg\gamma/2\pi; \quad r_{B2} = P_x \cdot z_2 \cdot ctg\gamma/2\pi \quad (14)$$

From $\Delta 0_1 N_1 M$ and $\Delta 0_2 N_2 M$ (FIG. 3) and by taking into account the formulas (13) and (14), we can determine the profile angles in the cross section $\alpha_{tm1}$ and $\alpha_{tm2}$ to be:

$$\cos\alpha_{tm1} = ctg\beta_{m1} \cdot ctg\gamma; \quad \cos\alpha_{tm2} = ctg\beta_{m2} \cdot ctg\gamma \quad (15)$$

The axle distance $a_w$ we can determine from $\Delta 0_1 M 0_2$ (FIG. 3).
$L0_1 M 0_2 = L0_1 M N_1 + L0_2 M N_1$, but $L0_1 M N_1 = 90° - \alpha_{tm1}$.
$L0_2 M N_1 = 180° - L0_2 M N_2 = 180° - (90° - \alpha_{tm2})$; therefore $L0_1 M 0_2 = 90° - \alpha_{tm1} + [180° - (90° - \alpha_{tm2})] = 180° - (\alpha_{tm1} - \alpha_{tm2})$.

Based on the cos ine law, the following results:

$$a_w = \sqrt{r_{m1}^2 + r_{m2}^2 + 2 \cdot r_{m1} \cdot r_{m2} \cdot \cos(\alpha_{tm1} - \alpha_{tm2})} \quad . \quad (16)$$

The circular radii of points and gaps are calculated by starting with the proportions determined by the cross section profile MH 4229-63 for the Novikov gears, as follows:

$$r_{a1} = r_{m1} + 0.2 \cdot P_x; \quad r_{a2} = r_{m2} + 0.2 \cdot P_x; \quad (17)$$

$$r_{f1} = a_w - r_{a2} - 0.08 \cdot P_x; \quad r_{f2} = a_w - r_{a1} - 0.08 \cdot P_x. \quad (18)$$

The radii for starting circles $r_{w1}$ and $r_{w2}$ are determined from known relations (3) as follows:

$$r_{w1} = z_1 \cdot a_w/(z_1 + z_2); \quad r_{w2} = z_2 \cdot a_w/(z_1 + z_2); \quad (19)$$

or by the i-ratio to be:

$$r_{w1} = a_w/(1+i); \quad r_{w2} = i \cdot a_w/(1+i). \quad (20)$$

To ensure that the tooth system contact point is outside of the engagement point, the following conditions must be met:

$$r_{w2} > r_{a2} \quad (21)$$

The tooth system angle cross section is determined from FIG. 3 to be:

$$\cos\alpha_{tw} = r_{B1}/r_{w1} = r_{B2}/r_{w2} \quad (22)$$

With the aid of angles $\delta_1$ and $\delta_2$ between the radius vectors to point M and the line $0_1 0_2$ connecting the central points $$\delta_1 = \alpha_{tm1} - \alpha_{tw}; \quad \delta_2 = \alpha_{tw} - \alpha_{tm2} \quad (23)$$

it is possible to express one operating radius through the other one, e.g.:

$$r_{m2} = \sqrt{a_w^2 + r_{m1}^2 - 2 \cdot a_w \cdot r_{m1} \cdot \cos\delta_1} \quad . \quad (24)$$

Figure 4:
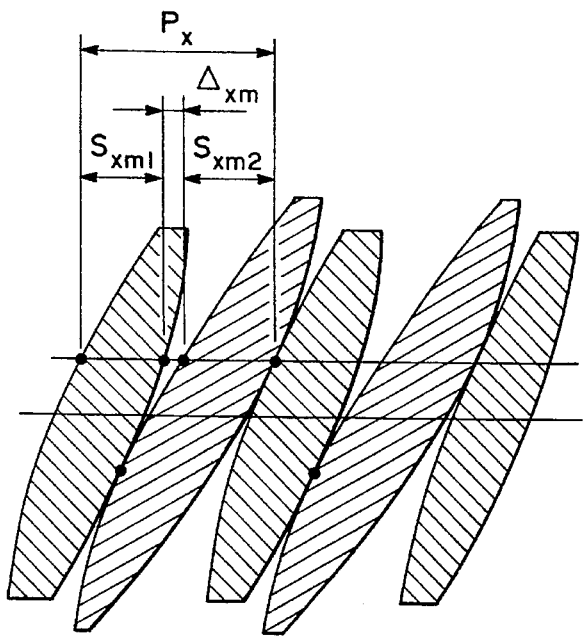

In the following, the thickness of one worm tooth at the operational radii is to be determined. Because the tooth inclination angles for worms 1 and 2 at the operational radii are different, there is axial play $\Delta_{xm}$ between the side surfaces of the teeth, which is shown in FIG. 4. This FIG. 4 shows a cross section of the gears through the level plane, which runs vertical to the connecting line $0_1 0_2$ and through the contact point. The difference between the axial displacement of two optional points, which move along the arc of the operational circle and correspond to double the angles $\delta_1$ and $\delta_2$ determines the amount of play $\Delta_{xm1}$ as follows:

$$\Delta_{xm} = P_x(\delta_2 \cdot r_{m2} \cdot ctg\beta_{m2} - \delta_1 \cdot r_{m1} \cdot ctg\beta_{m1}) \quad (25)$$

or, by taking into consideration (13) and (23):

$$\Delta_{xm} = P_x \cdot [\alpha_{tw} \cdot (z_1 + z_2) - \alpha_{tm1} \cdot z_1 - \alpha_{tm2} \cdot z_2]/\pi \quad (26)$$

The same axial tooth thickness $S_{xm}$ on the operational radii for worms 1 and 2—provided ($S_{xm1} = S_{xm2} = S_{xm}$)— results in FIG. 4:

$$S_{xm}=0.5\cdot(P_x-\Delta_{xm})=P_x\cdot\pi-[\alpha_{tw}\cdot(z_1+z_2)-\alpha_{tm1}\cdot z_1-\alpha_{tm2}\cdot z_2]/2\pi \quad (27)$$

which expresses all angles in a radiant. If the angles are expressed in degrees, the equation is as follows:

$$S_{xm}=0.5\cdot P_x\cdot 1-[\alpha_{tw}\cdot(z_1+z_2)-\alpha_{tm2}\cdot z_1-\alpha_{tm2}\cdot z_2]/180° \quad (28)$$

The worm tooth thickness in vertical direction $S_{nm1}$ and $S_{nm2}$ is determined by the following equation:

$$S_{nm1}=S_{xm}\cdot\sin\beta_{m1};\ S_{nm2}=S_{xm}\cdot\sin\beta_{m2} \quad (29)$$

Height h, where the tooth thickness of the worms is measured equals:

$$h=r_a-r_m=0.2\cdot P_x \quad (30)$$

The width of the second worm (or half the helical tooth for a helical gear) can be set equal to the operating width of ring $B_w$, which is determined by the requirement for a sufficient contact ratio coefficient. The main portion of this coefficient for the gears under consideration is its axial component $E_\beta$ (2). The first worm is assumed to be 10% bigger:

$$b_2=B_w=P_x\cdot E_\beta+S_{nm2}\cdot\sin\beta_{m2};\ b_1=1.1\cdot b_2 \quad (31)$$

The width of the technological grooves are assumed to be as follows:

$$c_1=0.8\cdot P_x;\ c_2=1.1\cdot c_1 \quad (32)$$

The total width of worms $B_1$ and $B_2$ is equal to:

$$B_1=2\cdot b_1+c_1;\ B_2=2\cdot b_2+c_2 \quad (33)$$

Threads $t_1$ and $t_2$ are calculated based on the following formula:

$$t_1=P_x\cdot z_1;\ t_2=P_x\cdot z_2 \quad (34)$$

If the center distance and the gear ratio are given, the geometric calculation must start with the selection of the pitch. To do this, the center distance for the individual pitch is calculated first. The desired pitch is then quotient of the given center distance and the one calculated for the individual pitch. If necessary, the pitch to the next suitable value can be rounded off with the following test for fulfilling the self-locking requirements.

I. Example of Geometric Calculation if the Center Distance can be Freely Selected Let us consider the sequence of the geometric calculations for a self-locking gear with optional center distance by using the following starting values:
$P_x=10$ mm; $z_1=1$; $z_2=5$; $f_{min}=0.1$; $f_{max}=0.2$; $\alpha_{mm2}=20°$ 1. From (7) and (12), we can determine the tooth inclination angle and the helical angle for the helical line for the second worm screw on the operational radius:

$$\cos\beta_{m2}=tg20°\sqrt{\sqrt{0.25+0.2^2/\sin^220°}-0.5}=0.189;$$

$$\beta_{m2}=79°07';\ \lambda_{m2}=90°-79°07'=10°53'.$$

2. With (9) we can determine the angle between normal and rotational axis:

$\cos\gamma=\sin 79°07'\cdot\cos 20°=0.923;\ \gamma=22°40'.$

3. With equations (10) and (12) we can determine the tooth inclination angle and the helical angle for the helical line for the first worm screw on the operational radius:

$$tg\beta_{m1}=\sqrt{\cos^222°40'/0.1^2+ctg^222°40'}=9.534;$$

$$\beta_{m1}=84°01';\ \alpha_{m1}=90°-84°01'=5°59'.$$

4. With (8) we can determine the profile angle in the normal section for the first worm screw:

$\cos\alpha_{nm1}=\cos 22°40'/\sin 84°01'=0.928;\ \alpha_{nm1}=21°53'.$

5. With (13) we can determine the base circle radii for the worm screws:

$r_{m1}10.1\cdot tg84°01'/2\pi=15.17$ mm; $r_{m2}=10.5\cdot tg79°07'/2\pi=41.36$ mm.

6. With (14) we can determined the base circle radius for the gears:

$r_{B1}=10.1\cdot ctg22°40'/2\pi=3.81$ mm; $r_{B2}=10.5\cdot ctg22°40'/2\pi=19.06$ mm.

7. With (15) we can determine the profile angle cross section for the worms:

$\cos\alpha_{tm1}=ctg84°01'\cdot ctg22°40'=0.260;\ \alpha_{tm1}=74°57';$
$\cos\alpha_{tm2}=ctg79°07'\cdot ctg22°40'=0.461;\ \alpha_{tm2}=62°34'.$ 8. With (16) we obtain the center distance:

$$a_w=\sqrt{15.17^2+41.36^2+2\cdot 15.17\cdot 41.36\cdot\cos(74°57'-62°34')}=56.27\text{ mm}.$$

9. With (17) we determine the circular radii for the points:
$r_{a1}=15.17+0.2\cdot 10=17.17$ mm; $r_{a2}=41.36+0.2:10=43.36$ mm.

10. With (18) we can determine the circular radii for the gaps:

$r_{f1}=56.27-43.36-0.08\cdot 10=12.11$ mm;
$r_{f2}=56.27-17.17-0.08\cdot 10=38.30$ mm.

11. With (19) we determine the radii for the starting circles and check whether requirement (21) has been met. This requirement stipulates that the contact point for the tooth system is outside of the point of interaction:

$r_{w1}=1\cdot 56.27/(1+5)=9.38$ mm; $r_{w2}=5\cdot 56.27/(1+5)=46.89$ mm;
46.89>43.36.

The requirement has been met.

12. With (22) we can determine the tooth system angle cross section:

$\cos\alpha_{tw}=3.81/9.38=0.406/\ \alpha_{tw}=66°02'.$

13. With (28) we can determine the axial tooth thickness on the operational radius:

$S_{xm}=0.5\cdot 10\cdot\{1-[2[66°02'\cdot(1+5)-74°57'\cdot 1-62°34'\cdot 5]/180°\}=4.77$ mm.

14. With (29) we determine the tooth thickness of the worms in vertical direction:

$S_{nm1}=4.77\cdot\sin 84°01'=4.74$ mm; $S_{nm2}=4.77\cdot\sin 79°07'=4.68$ mm.

15. With (30) we determine the height where the tooth thickness of the worms is measured:

$H=0.2\cdot 10=2$ mm.

16. With (31) we determine the width of half the helical teeth for the worms at $E_\beta=1.2$:

$b_2 = 10 \cdot 1.2 + 4.68 \cdot \sin 79°07' = 16.60$ mm; $b_1 = 1.1 \cdot 16.6 = 18.26$ mm.

17. With (32) we determine the width of the technological grooves:

$c_1 = 0.8 \cdot 10 = 8$ mm; $c_2 = 1.8 \cdot 8 = 8.8$ mm.

18. With (33) we determine the total width of the worms:

$B_1 = 2 \cdot 18.26 + 8 = 44.5$ mm; $B_2 \, 2 \cdot 16.6 + 8.8 = 42$ mm.

19. With (34) we determine the thread:

$t_1 = 10 \cdot 1 = 10$ mm; $t_2 = 10 \cdot 5 = 50$ mm.

20. With (5) we determine the curvature radii for the turning tools needed for the production of worms with a round tooth profile:

$$R_1 = 0.95 \cdot 3.81 \cdot tg 84°01' \cdot \sqrt{1 - (3.81/15.17)^2} = 33.40 \text{ mm.}$$

$$R_2 = 0.95 \cdot 19.06 \cdot tg 79°07' \cdot \sqrt{1 - (19.06//41.36)^2} = 83.53 \text{ mm.}$$

II. Example of Geometric Calculation with a Given Center Distance.

When replacing the traditional gears with self-locking gears in existing gear housings, the center distance $a_w$, the gear ratio i and worm widths $B_1$ and $B_2$ are given values. Let us take into consideration the sequence of geometric calculations for this case with the following starting values:

$a_w = 30$ mm; $B_1 = 19$ mm; $B_2 = 17$ mm; $i = 6$; $t_{min} = 0.1$; $f_{max} = 0.15$; $\propto_{nm1} = 20°$.

1. We will assume that $P_x = 1$; $Z_1 = 1$, $Z_2 = 6$.

2. With (6) and (12), we determine the tooth inclination angle and the helical angle for the helical line of the first worm on the operational diameter:

$$\cos\beta_{m1} = tg 20° \cdot \sqrt{\sqrt{0.25 + 0.1^2/\sin^2 20°} - 0.5} = 0.102;$$

$\beta_{m1} = 84°07'$; $\lambda_{m1} = 90° - 84°07' = 5°53'$.

3. With (8) we can determine the angle between the normal and the worm:

$\cos \gamma = \sin 84°07' \cdot \cos 20° = 0.935$; $\gamma = 20°49'$.

4. With (11) and (12), we determine the tooth inclination angle and the helical angle for the helical line of the second worm on the operating diameter:

$$tg\beta_{m2} = \sqrt{\cos^2 20°49'/0.15^2 + ctg^2 20°49'} = 6.764;$$

$\beta_{m2} = 81°35'$; $\lambda_{m2} = 90° - 81°35' = 8°25'$.

5. With (13) we determine the operational radii for the worms:

$r_{m1} = 1 \cdot 1 \cdot tg 84°07'/2\pi = 1.55$ mm; $r_{m2} = 1 \cdot 6 \cdot 6.764/2\pi = 6.37$ mm.

6. With (15) we determine the cross section for the worm profile angle:

$\cos \propto_{tm1} = ctg 84°07' \cdot ctg 20°49' = 0.271$; $\propto_{tm1} = 74°17'$;

$\cos \propto_{tm2} = ctg 81°35' \cdot ctg 20°49' = 0.389$; $\propto_{tm2} = 67°06'$.

7. With (16) we determine the center distance for the single pitch:

$$a_w = \sqrt{1.55^2 + 6.37^2 + 2 \cdot 1.55 \cdot 6.37 \cdot \cos(74°17' - 67°06')} = 7.91 \text{ mm.}$$

8. The desired pitch is:

$P_x = 30/7.91 = 3.79$ mm.

We will select $P_x = 4$ mm.

9. With (13) we determine the operating radius for the first worm:

$r_{m1} = 4 \cdot 1 \cdot tg 84°07'/2\pi = 6.18$ mm.

10. With (14) we determine the base circle radii for the worms:

$r_{B1} = 4 \cdot 1 \cdot ctg 20°49'/2\pi = 1.68$ mm; $r_{B2} = 4 \cdot 6 \cdot ctg 20°49'/2\pi = 10.05$ mm.

11. With (19) we determine the radii for the starting circles for the worms:

$r_{w1} = 1 \cdot 30/(1+6) = 4.29$ mm; $r_{w2} = 6 \cdot 30/(1+6) = 25.71$ mm.

12. With (22) we determine the tooth system angle in the cross section:

$\cos \propto_{tw} = 1.68/4.29 = 0.391$; $\propto_{tw} = 66°59'$.

13. With (23) we determine the angle between the radius vector of the contact point and the center line $O_1 O_2$:

$\delta_1 = 74°17' - 66°59' = 7°18'$.

14. With (24) we determine the operational radius for the second worm:

$$r_{m2} = \sqrt{30^2 + 6.18^2 - 2 \cdot 30 \cdot 6.18 + \cos 7°18'} = 23.88 \text{ mm.}$$

15. With (13) and (12) we determine the new value for the tooth inclination angle and the helical angle of the helical line for the second worm on the operational radius:

$tg\beta_{m2} = 23.88 \cdot 2\pi/4 \cdot 6 = 6.252$; $\beta_{m2} = 80°55'$; $\lambda_{m2} = 90° - 80°55' = 9°05'$.

16. A check of whether requirement (11) has been met, results in the following:

$80°55' < 81°35'$.

The requirement is met. If this requirement (11) had not been met, it would have meant that the pitch had been rounded off incorrectly.

17. With (9) we determine a normal section of the profile angle for the second worm:

$\cos \propto_{nm2} = \cos 20°49'/\sin 80°55' = 0.947$; $\propto_{nm2} = 18°48'$.

18. With (15) we obtain the profile angle cross section for the second worm:

$\cos \propto_{tm2} = ctg 80°55' \cdot ctg 20°49' = 0.421$; $\propto_{tm2} = 65°07'$.

19. With (17) we obtain the circular radii for the points:

$r_{a1} = 6.18 + 0.2 \cdot 4 = 6.98$ mm; $r_{a2} = 23.88 + 0.2 \cdot 4 = 24.68$ mm.

20. With (18) we can determine the circular radii for the gaps:

$r_{f1} = 30 - 24.68 - 0.08 \cdot 4 = 5.00$ mm; $r_{f2} = 30 - 6.98 - 0.08 \cdot 4 = 22.70$ mm.

21. Let us check whether requirement (21), which stipulates that the contact point for the tooth system is outside of the point of interaction, has been met:

$25.71 > 24.68$.

The requirement has been met.

22. With (28) we determine the axial tooth thickness on the operating radius:

$S_{xm} = 0.5 \cdot 4\{1 - [66°59' \cdot (1+6) - 74°17' \cdot 1 - 65°07' \cdot 6]/180°\} = 1.96$ mm.

23. With (29) we determine the worm tooth thickness in vertical direction:

$S_{nm1} = 1.96 \cdot \sin 84°07' = 1.95$; $S_{nm2} = 1.96 \cdot \sin 80°55' = 1.93$ mm 24. With (30) we determine the height where the tooth thickness for the worms is measured:

h=0.2·4=0.8 mm

25. With (32) and (33) we determine the width of the technological grooves and the width of the helical teeth for the worms:

$c_1$=0.8·4=3.2 mm; $c_2$=3.2·1.1=3.5 mm;

$b_1$=0.5·(19–3.2)=7.9 mm; $b_2$=0.5·(17–3.5)=6.8 mm.

26. With (31) we determine the axial contact ratio coefficient:

$E_\beta$=(6.8–1.93·sin 80°55')/4=1.2>1.

If the resulting value $E_\beta$ is not high enough, it is possible to increase either the width of the worms or the number of teeth. In the case at hand, for example, it is possible to state that $z_1$=2, $z_2$32 12.

27. With (34) we determine the thread:

$t_1$=4.1=4 mm; $t_2$=4·6=24 mm.

28. With (5) we determine the curvature radii for the turning tools necessary to produce the worms with round tooth profile:

$$R_1 = 0.95 \cdot 1.68 \, tg84°07' \cdot \sqrt{1-(1.68/6.18)^2} = 14.87 \text{ mm};$$

$$R_2 = 0.95 \cdot 10.05 \cdot tg80°55' \cdot \sqrt{1-(10.05/23.88)^2} = 54.16 \text{ mm}.$$

III. The Hertz Formula for Cylindrical Areas can be Used to Calculate the Contact Consistency:

$$\delta_H = 0.418 \cdot \sqrt{Q \cdot E/(1 \cdot \rho_{np})}$$

Whereby:

Q—normal force
E—elasticity module
l—length of contact line
ρnp.—reduced curvature radius $$Q = \frac{M_2}{2 \cdot r_{B2} \cdot \sin\gamma(1 - tg\alpha_{tm2}/tg\alpha_{tm1})}$$

whereby $M_2$ is the moment of load for the worm axis, $$1 = \sqrt{r_{a1}^2 - r_{B1}^2} + \sqrt{r_{a2}^2 - r_{B2}^2} - a_w \cdot \sin\alpha_{tw}$$

and $$\frac{1}{\rho_{np}} = \frac{\sin\gamma}{\sqrt{r_{m1}^2 - r_{B1}^2}} + \frac{\sin\gamma}{\sqrt{r_{m2}^2 - r_{B2}^2}}$$

IV. The Bending Strength is Calculated as Follows:

For an approximation calculation, we consider a tooth cross section through a plane which is tangential to the circle of gaps. The bend lever a is:

a=$r_{m1}$–$r_{f1}$–$S_{xm}$·tg$\propto_{nm1}$/2;

The cross-section height B (maximum) is:

B=$S_{xm}$+2·($r_{m1}$–$r_{f1}$)·tg$\propto_{nm1}$;

The cross-section length c is:

$$c = 2 \cdot \sqrt{2 \cdot (r_{a1} - r_{f1}) \cdot r_{a1} - (r_{a1} - r_{f1})^2} = 2 \cdot \sqrt{r_{a1}^2 - r_{f1}^2}.$$

The moment of inertia w for the cross section is:

w≈c·(B')²/6;

whereby B' is the average value for the cross-section height.

The bending moment is:

$M_{u32}$=Q·cos $\propto_{nm1}$·a and the bending tension:

$$\delta_N = \frac{M_{u32}}{W}$$

Figure 5:
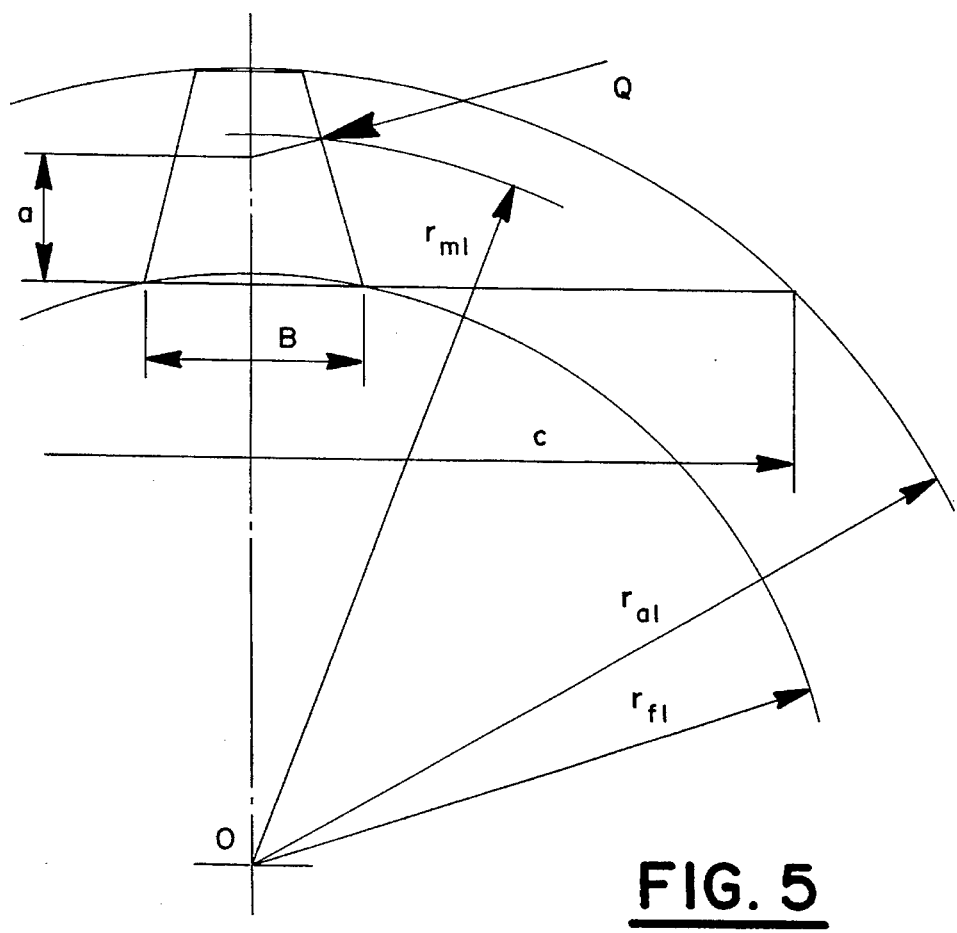
FIG. 5 details the bending strength.

See FIG. 5.

I claim:

1. A Self-locking dual worm gear having parallel axes and linear contact of the worms with an involute tooth system and wherein the worm profile cross sections of curvature radii $p_{nm1}$ and $p_{nm2}$ and the longitudinal sections of curvature radii $p_{xm1}$ and $p_{xm2}$ are determined respectively at a contact point M of the worm teeth using the following equations:

$p_{nm1}$=$p_{tm1}$/cos $\beta_{B1}$; $p_{nm2}$=$p_{tm2}$/cos $\beta_{B2}$, $P_{xm1}$=$P_{nm1}$·sin $\beta_{B1}$=$p_{tm1}$·tg$\beta_{B1}$; $P_{xm2}$=$p_{nm2}$·sin $\beta_{B2}$=$P_{tm2}$·tg$\beta_{B2}$, wherein $p_{tm1}$ and $p_{tm2}$ represent the curvature radii of an involute profile cross section at contact point M and $\beta_{B1}$ and $\beta_2$ are the tooth inclination angles at the base circles for the worms; and $$p_{tm1} = \sqrt{r_{m1}^2 - r_{B1}^2} \quad \text{and} \quad p_{tm2} = \sqrt{r_{m2}^2 - r_{B2}^2}$$

wherein $r_{m1}$ and $r_{m2}$ are the operational radii for the circles, which run through contact point M, and $r_{B1}$ and $r_{B2}$ are the base circle radii for the worms.

2. A Self-locking dual worm gear as in claim 1, and wherein the tooth inclination angles $\beta_{m1}$ and $\beta_{m2}$ are determined on the operational radii using the following formulas:

$$\cos\beta_{m1} \leq tg\alpha_{nm1}\sqrt{\sqrt{0.25 + f_{min}^2/\sin^2\alpha_{nm1}} - 0.5} \quad ;$$

$$\cos\beta_{m2} > tg\alpha_{nm2}\sqrt{\sqrt{0.25 + f_{max}^2/\sin^2\alpha_{nm2}} - 0.5} \quad ,$$

whereby $\alpha_{nm1}$ and $\alpha_{nm2}$ represent the cross section of the worm profile wheel angles and $f_{min}$ and $f_{max}$ represent the minimum and maximum values of the sliding friction coefficients for the tooth system.

3. A Tool with turning tools for producing the worm profiles for the self-locking dual worm gears as in claim 1 and wherein the turning tools have rounded cutters with curvature radii $R_1$ and $R_2$, determined by the following formulas:

$$R_1 = 0.95 \cdot r_{B1} \cdot tg\beta_{m1} \cdot \sqrt{1 - (r_{B1}/r_{m1})^2} \quad ;$$

$$R_2 = 0.95 \cdot r_{B2} \cdot tg\beta_{m2} \cdot \sqrt{1 - (r_{B2}/r_{m2})^2} \quad .$$

* * * * *